United States Patent [19]
Kopp

[11] 3,812,955
[45] May 28, 1974

[54] PUSHER DEVICE FOR ATTACHMENT TO A CHAIN CONVEYOR

[75] Inventor: Georg Kopp, Neuhausen Am Rheinfall, Switzerland

[73] Assignee: SIG Schweizerische Industrie-Gesellschaft, Neuhausen am Rheinfall, Switzerland

[22] Filed: Jan. 15, 1973

[21] Appl. No.: 323,910

[30] Foreign Application Priority Data
Jan. 25, 1972 Switzerland.................... 1086/72

[52] U.S. Cl. .............................. 198/170, 198/173
[51] Int. Cl. ............................................ B65g 19/26
[58] Field of Search .......... 198/170, 173, 175, 176, 198/200

[56] References Cited
UNITED STATES PATENTS
300,247   6/1884   Gordon............................. 198/170
1,593,501   7/1926   Martin et al...................... 198/170

Primary Examiner—Evon C. Blunk
Assistant Examiner—Jeffrey V. Nase
Attorney, Agent, or Firm—Spencer & Kaye

[57] ABSTRACT

A pusher device adapted to be pivotally attached to a chain conveyor to travel, with it, between a conveying path and a support path, and to move into and out of engagement with objects on the conveying path in dependence on the contour of the support path. Each device has a tooth with object and support path engaging portions and this tooth is pivotally mounted on a pin protruding from a side of the chain, by a separate chain element.

7 Claims, 5 Drawing Figures

PATENTED MAY 28 1974  3,812,955

PUSHER DEVICE FOR ATTACHMENT TO A CHAIN CONVEYOR

BACKGROUND OF THE INVENTION

The present invention relates to a pusher device attached to a chain conveyor and provided with a pusher tooth which is pivoted from an active position, in which it pushes an object disposed on a conveying path when the chain is in motion, to an inactive position when the means which secure the pusher tooth in the active position during passage through the conveying range are ineffective.

Known pusher devices of this type are provided with special chain members which must be inserted into the chain conveyor. The manufacture and installation of these rather heavy special members is expensive.

SUMMARY OF THE INVENTION

It is therefore an object of the invention to provide an arrangement whereby pusher devices can be attached to a chain conveyor in a simple and efficient manner so as to avoid problems encountered in previously known pusher devices.

This object is achieved according to the invention, in that the pusher tooth is pivotally attached, by means of chain elements which are identical to the corresponding elements of the transporting chain, to the portion of a double chain pin which protrudes with respect to the transporting chain.

Since all other parts except the pusher tooth itself are commercially available, mass produced, articles, which moreover are relatively light in weight, a substantial economic advantage results from the use of this pusher device according to the invention.

DESCRIPTION OF THE PREFERRED EMBODIMENTS

Figure 1:
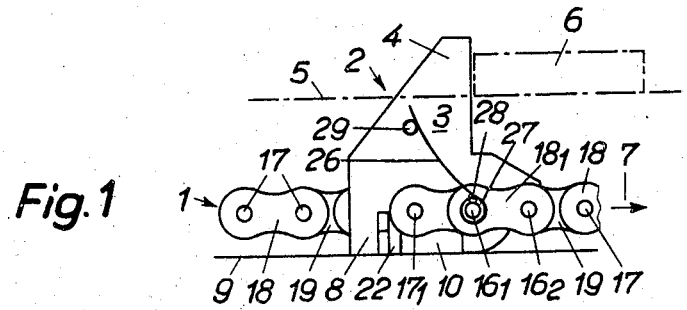
FIG. 1 is a side view of a pusher device according to the invention, attached to a chain conveyor.
Figure 2:
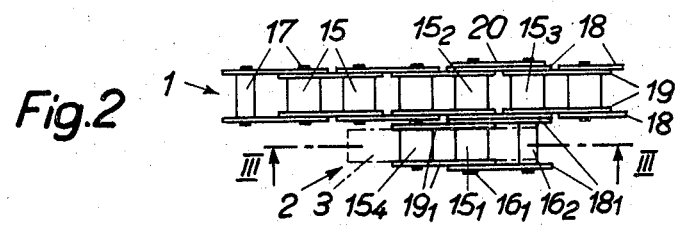
FIG. 2 is a plan view of the device of FIG. 1.
Figure 3:
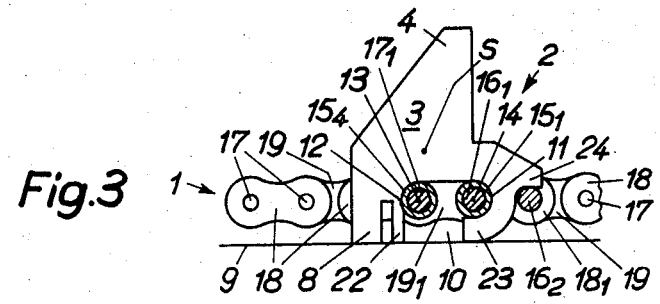
FIGS. 3 and 4 are cross-sectional views taken along the line III–III of FIG. 2 showing the pusher device in two different operating positions relative to the chain conveyor.

Referring now to FIGS. 1–4, there is shown a portion of an endless, closed chain conveyor, generally indicated at 1, which is provided with a plurality of pusher devices, generally indicated at 2, only one of which is shown in the drawings. Each device 2 includes a pusher tooth 3 in the form of a profiled plate. As seen in FIG. 1 the pusher tooth 3 has an upwardly tapered arm 4 which passes through a slit, not shown, in a conveying path 5 indicated by dot-dashed line. An object 6, also shown by dot-dashed lines, lies on this path 5 and is carried along in the direction of arrow 7 by arm 4 when chain 1 is in motion. Tooth 3 will push the object along the path 5 as long as the tooth is in its upright position as shown in FIGS. 1 and 3. Pusher tooth 3 is in this pushing position when a protrusion 8 provided thereon is supported on a supporting path 9 disposed below chain 1. In FIG. 2 only the outline of the pusher tooth 3 is shown which is imagined to be transparent.

As shown in FIG. 3, at its underside the pusher tooth 3 is provided with an opening 10 which has two oppositely disposed circular recesses 11 and 12 with the same radius and whose centers 13 and 14 lie at the same height above the supporting path 9. In recess 11, which extends over a centering angle of 180°, a bushing $15_1$ is disposed which is loosely received by a pin $16_1$ so that it is free to pivot or rotate thereabout. Pin $16_1$ is a double chain pin and is provided, as this is the custom for double chains, with two sleeves, i.e., the already mentioned sleeve $15_1$ and an identical sleeve $15_2$ belonging to chain 1.

Chain 1 is constructed in the usual manner of pins 17 provided with sleeves or bushings 15 as well as outer and inner side links or tongues 18 and 19, respectively, which alternatingly connect together the ends of successive chain pins 17 and are preferably identical. Chain 1 differs from the usual single chain only in that it is provided with two double chain pins 16 for each pusher device 2 attached thereto. In other words there is in addition to the already mentioned double chain pin $16_1$ another double chain pin $16_2$ which precedes the former in the direction of arrow 7, and which bears only the sleeve $15_3$ of the single chain 1. Pins $16_1$ and $16_2$ are connected together outside of the chain 1 by two outer tongues $18_1$. To fasten the double chain pins $16_1$ and $16_2$ to the chain 1, a normal end spring 20 is also provided as seen in FIG. 2.

The double chain pin $16_1$ bears a normal inner chain member formed by two inner tongues $19_1$, a chain pin $17_1$ and two sleeves $15_1$ and $15_4$. This inner member is rotatably mounted on the double chain pin $16_1$. Sleeve $15_4$ which is mounted on chain pin $17_1$ is disposed in recess 12 whose centering angle somewhat exceeds 90°, e.g. by about 20°. The portion of recess 12 which exceeds 90° is provided by a resilient finger 22 of pusher tooth 3 which finger extends downwardly next to protrusion 8.

As shown in FIGS. 1 and 3 this finger 22 is also supported on supporting path 9, but this however, is not absolutely necessary. It is also not necessary that the approximately hookshaped portion 23 of pusher tooth 3, which limits recess 11 at its downward end, contact the supporting path 9.

Pusher tooth 3 is also provided with a front tongue 24 which rests on the double chain pin $16_2$ in the active position of pusher tooth 3 as seen best in FIG. 3. This tongue 24 insures that pusher tooth 3 cannot at some point of the travel of the chain 1, pivot about the double chain pin $16_1$ in a clockwise direction. As long as pusher tooth 3 is supported on supporting path 9 in the vicinity of its trailing end, i.e., above the protrusion 8, such pivoting is not possible. This is so because the center of gravity S of the pusher tooth 3 and of the parts $17_1$, $15_4$, $19_1$ connected therewith trails behind the pivot axis $16_1$ and thus the weight of the pivotal parts acts in a counterclockwise manner.

Figure 4:
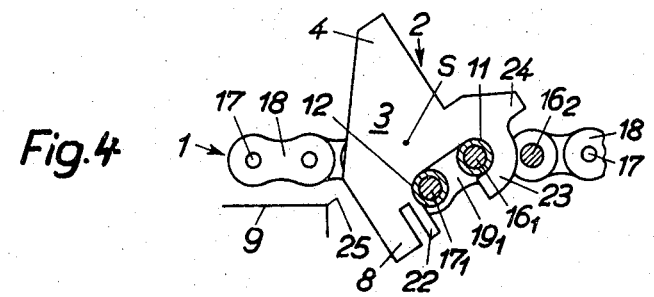

If, at a certain point along the conveying path 5, the pusher tooth 3 is no longer to carry along the object 6, which is gripped at this point by some other members, for example, packing or wrapping members, not shown, it is sufficient to terminate the supporting path 9 at that point, as shown at 25 in FIG. 4. The pusher tooth 3 is then pivoted counterclockwise and its pusher arm 4 falls below the level of conveying path 5 and is separated from object 6. Pusher tooth 3 will then swing about pivot axis $16_1$ until the tooth abuts, e.g. with its hook-shaped portion 23, on an abutment portion (not shown) preceding supporting path 9 so that the active position according to FIGS. 1 and 3 is re-established.

Figure 5:
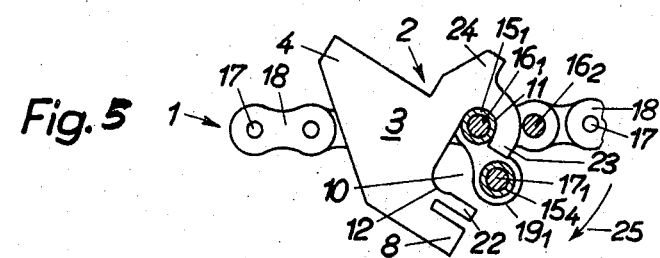
FIG. 5 is a cross-sectional view taken along the same line as in FIGS. 3 and 4 but showing the parts in an assembly position.

FIG. 5 shows the manner in which the pusher tooth 3 is attached to the chain link pivoting about double chain pin $16_1$. At first, pusher tooth 3 is brought to the vicinity of chain 1 at some point along the path of the chain where there is no supporting path 9 so that sleeve $15_1$ can be engaged in opening 10 and from there into recess 11. Then tongues $19_1$ and sleeve $15_4$ are pivoted, in the direction of arrow 25, about pin $16_1$ and sleeve $15_4$ is pressed into recess 12 with finger 22 resiliently yielding and then returning to its normal position. In this manner sleeve $15_4$ is secured in recess 12 and pusher tooth 3, with tongues $19_1$, chain pin $17_1$ and sleeve $15_4$, are connected into a single pivotal piece for normal operation.

If finger 22 is pushed back somewhat, sleeve $15_4$ can be removed from recess 12, for example in order to exchange pusher tooth 3 for a somewhat differently shaped pusher tooth of principally the same type, to effect a change in the conveying path and/or in the objects to be conveyed.

Compared to the conventional pusher devices, the abovedescribed device has the great advantage that no special chain members need be manufactured and installed in chain 1. It is only necessary to replace two single chain pins 17 per pusher device by two successive double chain pins $16_1$ and $16_2$. These pins $16_1$ and $16_2$ and parts $17_1$, $18_1$, $19_1$, 20, $15_1$ and $15_4$ are commercially available parts so that the entire pusher device except for pusher tooth 3 consists of mass-produced inexpensive elements. These elements have the advantage of a relatively light weight compared to the conventional special chain members and can be rapidly installed. Pusher devices of the described type permit closer spacing of the successive pins than the conventional special chain members. Thus, lightweight, inexpensive chains 1 with very small links can also be provided with such pusher devices 2.

If necessary the double chain pin $16_2$, which serves as an abutment for tongue 24, may be eliminated. The chain 1 then of course has a single chain pin 17 in its place.

If pusher tooth 3 is not pivotal in a vertical plane but rather in a horizontal plane, gravity forces can of course not be utilized to pivot the pusher arm 4 out of the range of a conveying path 5, disposed on the other side of the chain, when the pusher tooth 3 reaches the end 25 of a supporting path 9 which is disposed on the side of the chain. Instead as seen in FIG. 1, a wire spring 26 may be provided which has a few turns 27 and which itself is fastened on one side to the front end of the double chain pin $16_1$, for example by means of a central screw 28, while its other end is supported by a pin 29 fastened to pusher tooth 3. Consequently spring 26 produces the torque for pivoting pusher tooth 3 into a non-pushing position as soon as its protrusion 8 is no longer supported on supporting path 9.

In certain cases it may be desirable to control the deflection of the pusher tooth 3 from the active position into the inactive position according to a certain program. An appropriately designed control cam, not shown, can then be provided in the area of the end 25 of supporting path 9. A roller provided at pusher tooth 3 (also not shown) is then adapted to come into engagement with this cam and it is advantageous to have a form-fitting engagement.

It will be understood that the above description of the present invention is susceptible to various modifications, changes and adaptations, and the same are intended to be comprehended within the meaning and range of equivalents of the appended claims.

I claim:

1. In a conveyor having an endless roller chain disposed in a path of movement adjacent a conveying path and at least one pusher device attached to the chain for movement therewith; said pusher device including a pusher tooth and means for pivotally mounting said pusher tooth on said chain so that said tooth can be pivoted between a first position wherein a first portion of said tooth will contact objects in the conveying path and push them therealong upon movement of said chain, and a second position wherein said first portion of said tooth is withdrawn from the conveying path; and means for maintaining said tooth in said first position when it is effective and for permitting said tooth to pivot to said second position when it is ineffective; the improvement wherein: said means for pivotally mounting said tooth on said chain comprises a double chain pin attached to and forming a part of said chain, and a chain element which is substantially identical to the corresponding element of said chain, pivotally mounted on the laterally protruding portion of said double chain pin, said pusher tooth being attached to said chain element for movement therewith, said chain element including a first and a second sleeve, both having the same dimensions, said first sleeve being mounted on said protruding portion of said double chain pin, a single chain pin upon which said second sleeve is mounted, and a pair of side links, each of said side links having one end pivotally mounted on said protruding portion of said double chain pin adjacent a respective end of said first sleeve and its other end connected to a respective end of said single chain pin; said means for maintaining said tooth in a first position comprises a support path disposed adjacent said chain and against which said tooth abuts when in said first position; and said tooth is provided with an opening in the side thereof facing said support means when said tooth is in said first position, said opening having a shape such that two spaced oppositely disposed arcuately limited recesses with the same radius are provided therein, one of said recesses having a centering angle of 180° and the other of said recesses having a centering angle which exceeds a right angle by approximately 20°, said first sleeve being disposed within said first recess and said second sleeve being disposed within said second recess.

2. An arrangement as defined in claim 1 wherein: the chain pin of said chain which precedes said double chain pin in the direction of movement of said chain is a further double chain pin; and said tooth has a second portion which, in said first position of said tooth, abuts against the portion of said further double chain pin which protrudes from the side of said chain, thereby limiting the pivotal movement of said tooth in a first direction of rotation.

3. An arrangement as defined in claim 1, further comprising a resilient arm disposed on said tooth adjacent said second recess and extending along that portion of said second recess which exceeds the right angle, said arm being movable to permit the introduction of said second sleeve into said second recess and the removal thereof.

4. An arrangement as defined in claim 1 wherein: the chain pin of said chain which precedes said double chain pin in the direction of movement of said chain is a further double chain pin; and said tooth has a second portion which, in said first position of said tooth, abuts against the portion of said further double chain pin which protrudes from the side of said chain, thereby limiting the pivotal movement of said tooth in a first direction of rotation.

5. An arrangement as defined in claim 4, further comprising a separate pair of side links which are identical to the corresponding side links of said chain, said separate pair of side links connecting the protruding portions of said double chain pins.

6. An arrangement as defined in claim 1 wherein: said tooth is mounted on said double chain pin for pivotal movement in a vertical plane; said support path for maintaining said tooth in said first position is disposed below said chain; and said tooth has a further portion which is located at the rear of said tooth, in the sense of the direction of movement of said closed chain, said further portion contacting said support path when said tooth is in its said first position, the center of gravity of said tooth and said chain element being disposed rearwardly of said double chain pin.

7. An arrangement as defined in claim 1, wherein said tooth is mounted on said double chain pin for pivotal movement in a horizontal plane, and said support path for maintaining said tooth in said first position is located on one side of said chain and against which a portion of said tooth abuts when said tooth is in said first position; and further comprising resilient means biasing said tooth into contact with said support path when said tooth is in said first position, whereby said resilient means will cause said tooth to pivot to said second position when said supporting path is interrupted.

* * * * *